Aug. 12, 1952  E. F. ROSENBLATT ET AL  2,606,875
CONTROLLED ATMOSPHERE
Filed March 29, 1949  2 SHEETS—SHEET 1
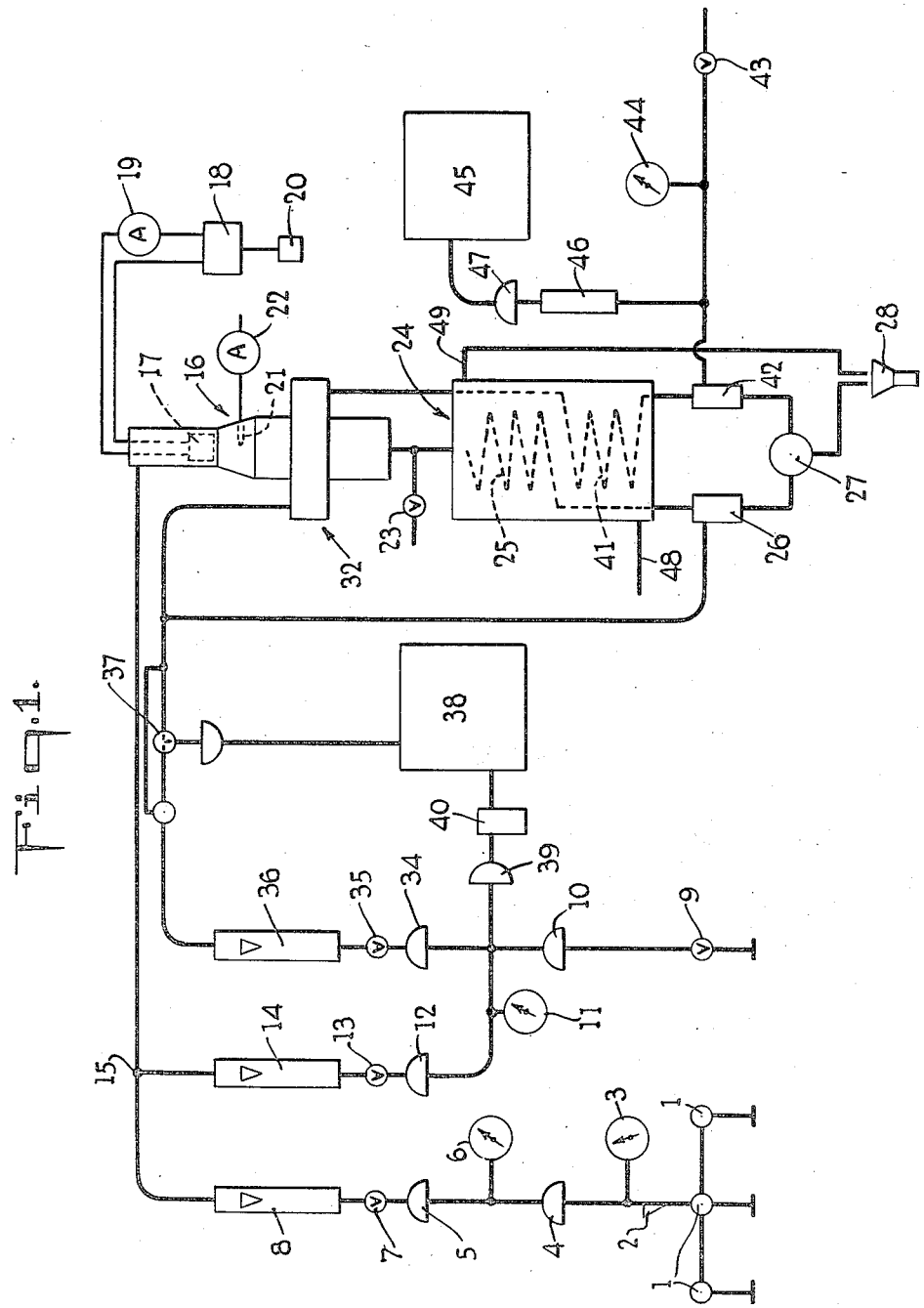
INVENTORS
EDGAR F. ROSENBLATT
JOHAN G. COHN
BY
ATTORNEY

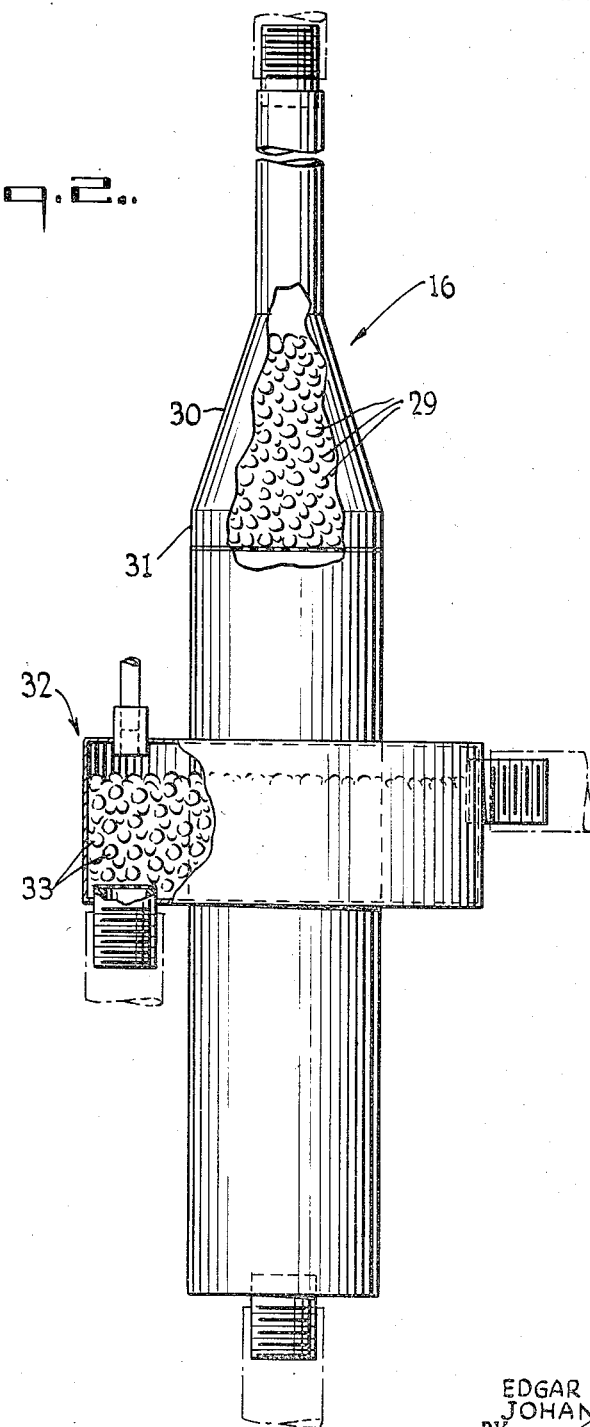

Patented Aug. 12, 1952

2,606,875

UNITED STATES PATENT OFFICE 2,606,875

CONTROLLED ATMOSPHERE

Edgar F. Rosenblatt, Montclair, and Johan G. Cohn, East Orange, N. J., assignors to Baker & Co., Inc., Newark, N. J., a corporation of New Jersey Application March 29, 1949, Serial No. 84,245

16 Claims. (Cl. 252—375)

This invention deals with a method of providing a controlled atmosphere and is concerned, more particularly, with the production of nitrogen and mixtures of nitrogen and hydrogen.

The use of controlled atmospheres is well known for a great variety of purposes. Controlled atmospheres are employed, e. g., in annealing operations and other metallurgical processes. They are used in refrigeration and the preservation of food. Nitrogen, as such, is also used in a number of processes for other purposes. Generally, however, the chief purpose of using a controlled atmosphere is the prevention of oxidation, e. g. of metals, which would otherwise occur, in the presence of air.

Where the amount of controlled atmosphere needed is small, resort is generally had to tank nitrogen and, where a reducing atmosphere is needed, to tank hydrogen as well. In other, relatively large scale, operations, the combustion products of gas, either city gas or natural gas, are employed after, of course, removal of any undesired components, such as carbon dioxide, etc. One source of a highly purified controlled atmosphere, to date perhaps the cheapest and most efficient source for large scale use, is the ammonia dissociator delivering, on cracking of the ammonia by heat, a gaseous mixture of 25% nitrogen and 75% hydrogen.

The present sources of controlled atmospheres suffer, however, from a number of shortcomings.

Inert atmospheres obtained from the combustion of city or natural gas are not pure and hence not capable of employment in many processes. Tank nitrogen and tank hydrogen are expensive and only a relatively small amount of gas is available in each container. Ammonia dissociators are quite expensive and dangerous in operation. They are economical only in large scale use and even then are subject to a number of shortcomings. In the first place, the splitting of the ammonia is an endothermic reaction and, hence, the ammonia dissociator requires continuous heating, which is quite expensive. In the second place, the dissociator delivers a nitrogen hydrogen mixture with 75% hydrogen, i. e. a hydrogen concentration, which on contact with air is highly explosive, and which is generally far in excess of that desired. Hence, supplementary equipment is sometimes used to burn the undesired part of the hydrogen concentration, a procedure which not only adds to the expense but is also dangerous. Attempts have been made to burn ammonia with a regulated amount of air to yield nitrogen or mixtures of nitrogen and hydrogen, but, despite the high caloric value of the ammonia combustion, such devices have not worked satisfactorily.

It is one object of this invention to provide a simple, safe and inexpensive source of controlled atmosphere, for large as well as small scale use.

It is another object of this invention to provide, as controlled atmosphere or otherwise, a source of nitrogen free from or containing a determined controlled content of hydrogen, and free from oxygen. Other objects and advantages of this invention will appear from the description thereof hereinafter following.

The invention is illustrated in the accompanying drawings, forming part hereof, in which:

Figure 1 represents a schematic diagram of the various steps of the method, and

Figure 2 represents a cross-sectional view of a catalyst chamber.

In accordance with the present invention, nitrogen and, if desired, the additional hydrogen, are produced from ammonia by catalytic combustion and catalytic cracking in such manner that the resultant nitrogen or nitrogen-hydrogen mixture s substantially pure and, in the case of the nitrogen-hydrogen mixture, has the desired specific hydrogen concentration.

The first feature, or step, of the method of the invention comprises the catalytic combustion and cracking of the gaseous ammonia. As far as oxidation of ammonia is concerned, the art knows two different reactions. The one most commonly known is that of oxidizing the ammonia to oxides of nitrogen, according to the formula $4NH_3 + 5O_2 = 4NO + 6H_2O$, in the presence of solid catalyst, e. g. platinum gauze. The other reaction, employed in the instant case, is that of oxidizing the ammonia to nitrogen, according to the formula $4NH_3 + 3O_2 = 2N_2 + 6H_2O$. The cracking of ammonia involves the formula $4NH_3 = 2N_2 + 6H_2$.

Where it is desired to produce pure nitrogen from the ammonia, oxidation only takes place. Where, however, the admixture of hydrogen is desired the initial part of the process involves oxidation as well as cracking. The oxidation of ammonia to nitrogen is an exothermic reaction, in fact a strongly exothermic reaction, whereas the cracking of ammonia is an endothermic reaction. In the method of the invention, we may employ the exothermic reaction only or simultaneously, the exothermic reaction and the endothermic reaction in a ratio dependent on the amount of hydrogen desired in the mixture. The ratio is controlled by the amount of ammonia in the ammonia-air mixture in excess of the stoichiometric ratio of the formula $4 NH_3 + 3O_2 = 2N_2 + 6H_2O$, i. e. in the case of a normal ammonia-air mixture in excess of 21.83% ammonia, per volume.

It is another feature, or step, in the method of the invention that we employ as starting mixture one in which there is an excess of ammonia beyond such stoichiometric ratio and that we eliminate any unwanted excess of hydrogen by means of flameless catalytic combustion of the excess.

Where the reaction also produces some traces of oxides of nitrogen, as is inevitable in particular in production of low hydrogen concentration (up to about 5% $H_2$) mixtures, it is a further feature of the complete method of the invention to eliminate such traces of oxides of nitrogen, wherever such oxides are deleterious in their effect.

Referring to the drawings, the details of which are merely illustrative and not limitative, the ammonia gas enters, from tanks not shown, the manifold 1 and may be cleaned in the strainer 2. Advantageously, the pressure of the gas is then measured by a gage 3 and the pressure reduced by regulators 4 and 5, with intermediate pressure gage 6, to a suitable constant pressure of, e. g., 30 lbs. by regulator 4 and 4 lbs. by regulator 5.

The ammonia flow rate is then adjusted by flow valve 7 and measured by the rotameter 8. Air is admitted through valve 9 and the pressure reduced, by regulator 10, to a pressure convenient for operation of the process, e. g. in the example given to 30 lbs. One stream of the air, after being measured as to pressure by the gage 11, is then reduced in pressure by regulator 12 to, e. g., 4 lbs. and after adjustment in the flow valve 13 and measuring in the rotameter 14 is admixed with the ammonia gas at junction 15. The ammonia-air mixture then enters the catalyst chamber 16.

While the oxidation reaction is strongly exothermic in operation, it requires ignition and hence there is provided within the catalyst chamber 16 a starting heater 17 which, advantageously, consists of a few turns of non-catalytic electrical resistance wire, e. g. 16 turns of 0.026" nickel chromium alloy wire carrying a current of about 12 amperes supplied from a source of power, e. g. transformer, 18 and measured by the ammeter 19. This starting heater is operated by switch 20. Once the reaction has started the heater 17 is turned off.

Proper working of the oxidation process is indicated by measuring the temperature within the catalyst chamber, e. g. by means of a thermocouple 21 connected to a pyrometer 22.

The reacted gas mixture leaves the catalyst chamber 16 either through purge valve 23, used during starting up of the process, or during operation into a condenser 24, with cooling coil 25, to condense the water vapor, the water being stripped from the gas by the trap 26 and discharged through trap 27. Funnel 28 receives the thus discharged water and also the cooling water of the condenser 24.

In the catalyst chamber, the ammonia gas is oxidized as well as cracked, as above pointed out. The ammonia-air mixture contains ammonia in excess of the stoichiometric ratio of the formula $4NH_3 + 3O_2 = 4N_2 + 6H_2O$, or more than approximately 21.83% ammonia. Whenever it is desired to have nitrogen free from any admixture of hydrogen, such hydrogen is removed as hereinafter more fully explained. Wherever free hydrogen is desired, there must be, in the mixture, such an excess of ammonia that at least a small excess of hydrogen over the desired ultimate concentration thereof is produced, or e. g. more than 23.81% ammonia for 5% free hydrogen, more than 33.95% ammonia for 25% free hydrogen and more than 54.87% ammonia for 50% free hydrogen.

The catalyst chamber is shown more specifically in Figure 2.

The oxidation catalyst employed comprises essentially platinum deposited on a suitable carrier in pelleted or other subdivided form. Experiments have shown that platinum constitutes the most desirable type of catalyst for this reaction, rather than other metals of the platinum group, such as palladium. The platinum, which may, but need not, be combined with other catalyst metals, is deposited in a uniform layer on the support, which consists preferably of alumina or zirconium dioxide, being dehydrated either prior to the formation of the catalyst or by heating of the catalyst, e. g. when used in the process. One very desirable support is activated alumina. The amount of platinum thus deposited on the surface of the carrier is normally very small. Without being limited thereto either as a maximum or a minimum, we employ usually about 0.5% platinum by weight, relative to the total weight of the supported catalyst, including the catalyst and the support.

We have noted that the efficiency of the oxidation of ammonia to nitrogen depends largely on the linear flow rate of the ammonia through the catalyst chamber. In experiments using a cylindrical tube, ⅞" inside diameter, and a 2 inch catalyst bed of platinum catalysts, 0.5% platinum on alumina pellets, the oxidation of a mixture of ammonia and air containing 22.1% ammonia produced the following rates of efficiency.

| Gas Mixture Linear Speed, Feet/Second | Percent Ammonia Converted |
| --- | --- |
| 0.225 | 93.50 |
| 0.450 | 96.00 |
| 0.900 | 99.00 |
| 1.350 | 99.85 |

In this experiment, a flow rate of 0.225 foot/second left, therefore, 6.5% of the ammonia unconverted, whereas a flow rate of 1.35 feet/second resulted in a remainder of only 0.15% unconverted ammonia.

In order to provide an efficient catalyst system for the oxidation of ammonia to nitrogen, it is necessary, therefore, to adjust the flow rate to that which produces optimum results. In practice, this would mean that a production unit is operable, efficiently, only at that capacity for which it is designed. Such limitation would make any such unit impractical, since under field conditions, it is required to deliver at varying capacities as may be desired.

In order to obviate such limitation and then provide an apparatus capable of delivering at varying rates of capacity, the catalyst chamber 16, containing the pelleted catalyst 29, is provided in frustroconical shape, as shown, the ammonia mixture entering at the narrow end and leaving at the wide end.

Along the length of the thus conically arranged catalyst bed, there is, therefore, always a zone in which the velocity of the ammonia stream is at or above the minimum at which optimum efficiency in converting the ammonia to nitrogen occurs, irrespective of the quantity of ammonia gas passed through the catalyst bed, thus assuring substantially complete oxidation at some level of the catalyst bed, independently of the volume of ammonia introduced. The catalyst chamber 16 with its conical wall 30 terminates in a short cylindrical section 31, at the wide end of the cone, so as to make sure that the ammonia gas has had, in any case, an adequate opportunity to be in contact with the catalyst.

If the volume of gas introduced is small, and, therefore, the velocity low, the reaction occurs predominantly at the narrow end of the cone, but if the volume is large, and, therefore, the velocity high, the reaction occurs predominantly at the wide end.

The catalytic reaction mixture produced by oxidation of the ammonia to nitrogen contains, however, some oxides of nitrogen, which are advantageously removed since for many processes, the presence of oxides of nitrogen in the controlled atmosphere is highly deleterious. The formation of such oxides of nitrogen occurs primarily where the reaction mixture is close to the stoichiometric ratio of ammonia and oxygen, i. e. where the present process is used to produce nitrogen containing low hydrogen concentrations.

The traces of oxides of nitrogen are completely eliminated from the mixture of nitrogen and hydrogen when the hydrogen containing gas is passed, in the presence of oxygen, over a suitable catalyst. It is for this reason that a certain excess of ammonia is employed in the initial ammonia-air mixture. The hydrogen thus produced in excess over that desired in the ultimate controlled atmosphere is reacted with oxygen, e. g. in the form of secondarily introduced air. The reaction serves to eliminate the oxides of nitrogen while simultaneously eliminating any free oxygen and reducing the hydrogen to the desired concentration or eliminating it entirely.

The catalytic process of eliminating the oxides of nitrogen and converting the hydrogen is best accomplished over a catalyst of palladium deposited on a carrier of aluminum oxide or zirconium dioxide, prepared like the platinum catalyst previously described, the palladium being deposited in a uniform layer over the surface of the carrier, preferably of pelleted shape or the like, in a small quantity, e. g. 0.5% by weight of total supported catalyst, including carrier and catalyst metal. Such catalyst would be operable at low temperatures for the oxidation of the hydrogen but requires for the destruction of the oxides of nitrogen operation at an elevated temperature of the order of 100° C. or more. The reacted gas containing the oxides of nitrogen as well as the hydrogen, and containing the addition of a controlled amount of air to supply the required quantity of oxygen, is, therefore, passed over such palladium catalyst to eliminate the oxides of nitrogen completely and the hydrogen to whatever extent is desired.

In order to provide the necessary preheating of the palladium catalyst, the catalyst chamber must either be heated, e. g. by an electric resistance heater or other means. In our system, one highly advantageous and economical method of heating is afforded by the exothermic oxidation of the ammonia and, therefore, we simply arrange this secondary catalyst chamber in the neighborhood of the primary catalyst chamber in which the ammonia is oxidized.

Thus, referring to Figure 1, the mixture of nitrogen, oxides of nitrogen and hydrogen coming from the condenser coil 25 proceeds, after being stripped of its water content, to the catalyst chamber 32 which, as more particularly shown in Figure 2, is built annularly around the pipe leading from the catalyst chamber. The supported catalyst of palladium on activated alumina pellets or the like is indicated at 33.

Prior to admission to the catalyst chamber 32, the gas must be mixed with some oxygen for the combination of that amount of hydrogen which is to be eliminated. The admixture of the oxygen must, therefore, be carefully controlled. The admission of air is illustrated in Figure 1. Air coming from the pressure reducer 10 is passed through regulator 34 which reduces the pressure, in the schematic set-up shown, from 30 lbs. to 4 lbs. per square inch, and is then passed on through valve 35 and rotameter 36. The correct pressure and admission of the air to the gas stream is controlled by valve 37 which may be operated manually or otherwise, e. g., as illustrated, by means of a pneumatic controller 38 into which air is fed through pressure reducer 39 and filter 40.

After leaving the catalyst chamber 32, the gas purified from oxides of nitrogen and with a controlled hydrogen content enters the condenser coil 41 of the condenser 24. The condensed water is stripped in trap 42 and discharged through 27. The gas itself after leaving the trap 42 leaves the system through valve 43, after its pressure is measured, if desired, by gage 44. There may also be provided an analyzer 45 for the gas, drawing a sample from the line through a dryer 46 and regulating valve 47. The impulses of the analyzer 45 may be fed into the recorder controller 38.

The condenser 24 may be operated in any suitable manner, e. g. by the admission of cooling water through inlet 48, flowing out at 49 into the funnel 28.

The functioning of the apparatus described specifically so far deals essentially with the catalytic combustion of the ammonia to nitrogen. The simultaneous production of hydrogen by cracking of the ammonia is also accomplished in the catalyst chamber 16, by providing an excess of ammonia over the stoichiometric ratio, in such excess as to furnish the desired amount of free hydrogen. One noteworthy feature is that this cracking may be accomplished without the addition of heat, notwithstanding the endothermic character of the reaction, since the exothermic oxidation of the ammonia is adapted to supply the necessary quantity of heat to successfully carry out the endothermic cracking reaction in the presence of the catalyst.

Where the desired reaction in the catalyst chamber 16 is essentially one of combusting the ammonia to nitrogen, or to nitrogen containing only a few percent of hydrogen, the best catalyst is, as pointed out above, one comprising primarily platinum, deposited on a suitable support, such as, preferably, dehydrated alumina or zirconium dioxide in subdivided, e. g. pelleted, form. This best catalyst applies, therefore, to the reaction $4NH_3 + 3O_2 = 2N_2 + 6H_2O$.

Where, however, the reaction also involves cracking of the ammonia, according to the formula $4NH_3 = 2N_2 + 6H_2$, it is advantageous to also use in the catalyst chamber a catalyst more specific to the cracking reaction. We have discovered that this reaction is most advantageously carried out in the presence of a catalyst of a metal taken from the group ruthenium, rhodium and iridium, deposited on a support, such as dehydrated alumina or dehydrated zirconium dioxide, in subdivided, e. g. pelleted, form.

Tests and experiments have shown that whereas, under given conditions of gas flow and catalyst bed, a supported platinum catalyst promotes the decomposition of only 24% of the ammonia into nitrogen and hydrogen at even a temperature as high as 600° C., supported catalysts of rhodium and ruthenium promote the decomposition of 68% to 70% of the ammonia already at 500° C. Compared with the performance of platinum a catalyst of iridium supported on activated alumina converts at 600° C. 94% of the ammonia into nitrogen and hydrogen. In these tests, the gas mixture consisted of 25% ammonia and 75% nitrogen, a typical mixture of ammonia and nitrogen after the initial catalytic conversion of the ammonia.

Where, therefore, the object is to combust and crack ammonia, the catalyst in the chamber 16 should comprise platinum as well as rhodium, ruthenium or iridium. While it is possible to simultaneously deposit the combustion catalyst and the cracking catalyst on the same carrier, it is preferable to have such catalysts separate, providing the supported catalyst first in the path of the ammonia-air stream, as in the conical part of the catalyst chamber 16, and then providing a suitable layer of supported cracking catalyst or providing the different supported catalysts interspersed to form a single catalyst bed.

The amounts of hydrogen which may be produced by simultaneous cracking of ammonia during combustion are indicated by the following table in which are listed the theoretical ammonia-air mixtures and the maximum combustion temperatures for various hydrogen concentrations:

| Percent Hydrogen in Nitrogen | Theoretical Percent Ammonia in Air | Maximum theoretical Combustion Temperature in ° C. |
| --- | --- | --- |
| Percent | | |
| 0 | 21.8 | 1,775 |
| 20 | 31.0 | 1,450 |
| 30 | 37.1 | 1,160 |
| 40 | 44.7 | 840 |
| 50 | 54.7 | 475 |

Only a slight excess of ammonia over the theoretical amount is required for the purpose of the second catalytic reaction as described. Hence, it is seen from the table that large percentages of hydrogen may be produced maintaining the exothermic character of the overall process as evidenced by the values of theoretical combustion temperatures. It is only in use of high hydrogen concentrations, such as 50%, that moderate external heating may be required, which, however, requires much less power consumption than is necessary for the operation of the conventional ammonia dissociators.

In most operations of the process, there is even enough surplus heat available to evaporate the liquid ammonia from the tank which is necessary for the production of larger volumes of controlled atmospheres.

It will be noted, therefore, that the method of the present invention makes possible the supply of an inert atmosphere, for industrial and other purposes, in a most economical manner, for small as well as large uses. As distinguished from some prior art methods of supplying inert atmospheres, the present invention is safe and no supplementary safety equipment is needed. The atmosphere is adapted to be provided free from hydrogen or with a controlled amount of hydrogen, up to very high concentrations of hydrogen, as may be desired.

What we claim is:

1. The method of providing a controlled atmosphere, comprising passing a mixture of gaseous ammonia and oxygen containing gas, wherein the molecular ratio of ammonia to oxygen is greater than 4:3, over a supported catalyst, wherein the catalyst metal is primarily platinum, to convert the ammonia to nitrogen and hydrogen and water vapor, said mixture passing over said catalyst at a temperature of at least 500° C., stripping the reacted mixture from water vapor, adding to the gases remaining after the stripping step an oxygen containing gas, and passing the resulting gaseous mixture from said adding step over a supported catalyst heated to at least about 100° C., wherein the catalyst metal is primarily palladium, to eliminate at least some hydrogen and substantially all oxides of nitrogen formed during the oxidation of said ammonia.

2. The method of providing a controlled atmosphere, comprising passing a mixture of gaseous ammonia and oxygen containing gas, wherein the molecular ratio of ammonia to oxygen is greater than 4:3, over a supported catalyst of platinum and a metal taken from the group rhodium, ruthenium and iridium, to convert said ammonia in part into nitrogen and water vapor and in part into nitrogen and hydrogen, said mixture passing over said catalyst at a temperature of at least 500° C., and over a supported catalyst of palladium, heated to at least about 100° C., to eliminate oxides of nitrogen, which may have been formed during the passage of said mixture over said other catalyst.

3. The method of providing a controlled atmosphere comprising mixing gaseous ammonia with an oxygen containing gas so that oxygen is present in the mixture in an amount not exceeding 75 percent of the ammonia, passing said mixture in contact with a first supported catalyst, wherein the catalyst metal is primarily platinum, to promote reaction of the constituents in said mixture, said mixture passing over said catalyst at a temperature of at least 500° C., passing at least part of the products of said reaction in contact with a second supported catalyst heated to at least about 100° C., wherein the catalyst metal of said second supported catalyst is primarily palladium to eliminate substantially all oxides of nitrogen that may have been formed during the passage of said mixture over said first supported catalyst.

4. The method of providing a controlled atmosphere comprising mixing gaseous ammonia with an oxygen containing gas so that oxygen is present in the mixture in an amount not exceeding 75 percent of the ammonia, passing said mixture in contact with a first supported catalyst, wherein the catalyst metal is primarily platinum, to promote reaction of the constituents in said mixture, said mixture passing over said catalyst at a temperature of at least 500° C., adding an oxygen containing gas to at least a part of the products from said reaction, and passing said part over a second supported catalyst, heated to at least about 100° C., wherein the catalyst metal of said second supported catalyst is primarily palladium, to eliminate substantially all oxides of nitrogen that may have been formed during the passage of said mixture over said first supported catalyst.

5. The method according to claim 4, in which the support of said platinum and said palladium catalyst is taken from the group of dehydrated alumina and zirconium dioxide.

6. The method according to claim 4, in which the palladium catalyst is heated by the reaction over the platinum catalyst.

7. The method of claim 4, in which the volume of oxygen containing gas admixed with the reacted gas mixture prior to passing thereof over the palladium catalyst contains a controlled amount of oxygen calculated to eliminate in the presence of said palladium catalyst a predetermined amount of hydrogen, whereby to adjust the hydrogen content of said mixture to a controlled amount.

8. The method according to claim 4 in which said mixture of gaseous ammonia and oxygen containing gas is heated prior to contacting with said first catalyst, and discontinuing said heating when said first catalyst promotes reaction of the constituents in said mixture.

9. The method of providing a controlled atmosphere comprising the steps of mixing ammonia and air so that the mixture contains ammonia in an amount of from 21.8% to 54.7%, contacting said mixture with supported platinum catalyst for combustion of ammonia to nitrogen and water, contacting products of said combustion with supported palladium catalyst, heated to at least about 100° C., to eliminate the oxides of nitrogen that may have been formed during said combustion.

10. The method of claim 9 wherein platinum is present in said platinum supported catalyst and palladium is present in said palladium supported catalyst in amounts of from 0.1% to 2% by weight.

11. The method of providing a controlled atmosphere comprising the steps of mixing ammonia and air so that the mixture contains ammonia in an amount of from 21.8% to 54.7%, contacting said mixture with supported platinum catalyst for combustion of ammonia to nitrogen and water, said mixture passing over said catalyst at a temperature of at least 500° C., and with ammonia cracking catalyst for cracking ammonia to nitrogen and hydrogen, contacting the products of said combustion and said cracking with supported palladium catalyst, heated to at least about 100° C., to eliminate the oxides of nitrogen that may have been formed during said combustion.

12. The method producing a controlled atmosphere comprising the steps of mixing ammonia in air so that the mixture contains ammonia in an amount of at least four-thirds times the amount of oxygen in said mixture, contacting said mixture with supported platinum catalyst for combustion of ammonia to nitrogen and water, said mixture passing over said catalyst at a temperature of at least 500° C., and with ammonia cracking catalyst for cracking ammonia to nitrogen and hydrogen whereby the heat of said combustion supports said cracking, the volume of ammonia in said mixture being controlled whereby no heat need be added from an outside source to support said cracking, and over a supported catalyst of palladium, heated to at least about 100° C., to eliminate oxides of nitrogen, which may have been formed during the passage of said mixture over said other catalysts.

13. The method of claim 12 wherein said supported platinum catalyst and said cracking catalyst are mixed together whereby combustion and cracking reactions occur concurrently.

14. The process of claim 12 wherein said mixture is contacted with said supported platinum catalyst and thereafter is contacted with said cracking catalyst.

15. The method of producing a controlled atmosphere comprising the steps of mixing ammonia in air so that the mixture contains ammonia in an amount of from 21.8% to 54.7%, contacting said mixture with supported platinum catalyst for combustion of ammonia to nitrogen and water, said mixture passing over said catalyst at a temperature of at least 500° C., and with ammonia cracking catalyst for cracking ammonia to nitrogen and hydrogen whereby the heat of said combustion supports said cracking, and over a supported catalyst of palladium, heated to at least about 100° C., to eliminate oxides of nitrogen which may have been formed during the passage of said mixture over said other catalysts.

16. The process of producing controlled atmosphere comprising the steps of placing supported catalyst in subdivided form into a frustum shaped container open at opposite ends, said supported catalyst being a mixture of a plurality of catalysts, one of said catalysts being platinum supported catalyst, another of said catalysts being a cracking catalyst and comprising as catalyst metal at least one metal of the group consisting of rhodium, ruthenium and iridium, the supports for said catalysts being dehydrated oxide, the catalysts metals being present on said supports in an amount of from 0.1% to 2% by weight, mixing ammonia with air so that the gas mixture contains ammonia in an amount of from 21.8% to 54.7% passing said gas mixture into the smaller opening of said container, whereby some of said ammonia is converted to nitrogen and water by said platinum catalyst and some of said ammonia is cracked to nitrogen and hydrogen by said cracking catalyst, said mixture passing over said catalysts at a temperature of at least 500° C., the heat of said conversion supporting said cracking, and over a supported catalyst of palladium, heated to at least about 100° C., to eliminate oxides of nitrogen which may have been formed during the passage of said mixture over said other catalysts.

EDGAR F. ROSENBLATT.
JOHAN G. COHN.

REFERENCES CITED

The following references are of record in the file of this patent:

UNITED STATES PATENTS

| Number | Name | Date |
|---|---|---|
| 1,821,956 | Yee | Sept. 8, 1931 |
| 1,962,485 | Dely | June 12, 1934 |
| 1,988,781 | Burke | Jan. 22, 1935 |
| 2,010,235 | Jaeger | Aug. 6, 1935 |
| 2,013,652 | Hall | Sept. 10, 1935 |
| 2,071,119 | Harger | Feb. 16, 1937 |
| 2,076,953 | Lacy | Apr. 13, 1937 |
| 2,276,229 | Dixon | Mar. 10, 1942 |
| 2,381,696 | Shapleigh | Aug. 7, 1945 |
| 2,432,543 | Pricket et al. | Dec. 16, 1947 |
| 2,443,773 | Matuszak | June 22, 1948 |
| 2,483,948 | Underwood | Oct. 4, 1949 |

FOREIGN PATENTS

| Number | Country | Date |
|---|---|---|
| 446,435 | Great Britain | Apr. 30, 1936 |
| 463,804 | Great Britain | Apr. 7, 1937 |